United States Patent
Skans et al.

(10) Patent No.: US 12,094,236 B2
(45) Date of Patent: Sep. 17, 2024

(54) METHOD OF OBJECT RE-IDENTIFICATION

(71) Applicant: Axis AB, Lund (SE)

(72) Inventors: Markus Skans, Lund (SE); Christian Colliander, Lund (SE); Martin Ljungqvist, Lund (SE); Willie Betschart, Lund (SE); Niclas Danielsson, Lund (SE)

(73) Assignee: AXIS AB, Lund (SE)

( * ) Notice: Subject to any disclaimer, the term of this patent is extended or adjusted under 35 U.S.C. 154(b) by 982 days.

(21) Appl. No.: 17/038,528

(22) Filed: Sep. 30, 2020

(65) Prior Publication Data

US 2021/0142149 A1   May 13, 2021

(30) Foreign Application Priority Data

Nov. 8, 2019 (EP) ..................... 19207906

(51) Int. Cl.
*G06V 10/80* (2022.01)
*G06F 18/214* (2023.01)
(Continued)

(52) U.S. Cl.
CPC .......... *G06V 40/107* (2022.01); *G06F 18/214* (2023.01); *G06F 18/22* (2023.01);
(Continued)

(58) Field of Classification Search
CPC ...... G06V 40/107; G06V 20/52; G06V 10/82; G06V 10/44; G06V 40/23; G06V 10/764;
(Continued)

(56) References Cited

U.S. PATENT DOCUMENTS

| 10,963,677 | B2* | 3/2021 | Henderson | G06N 3/044 |
| 11,645,506 | B2* | 5/2023 | Wang | G06N 3/08 |
| | | | | 706/15 |

(Continued)

FOREIGN PATENT DOCUMENTS

| CN | 108154104 A | 6/2018 |
| CN | 108717531 A | 10/2018 |

(Continued)

OTHER PUBLICATIONS

Extended European Search Report dated Apr. 21, 2020 for the European Patent Application No. 19207906.9.

*Primary Examiner* — Mahelet Shiberou
(74) *Attorney, Agent, or Firm* — Volpe Koenig

(57) ABSTRACT

A method of object re-identification in images of objects comprises providing a plurality of neural networks for object re-identification, wherein each of the plurality of neural networks is trained on image data with different sets of anatomical features, each set being represented by a reference vector; receiving a plurality of images of objects and an input vector representing anatomical features that are depicted in all of the plurality of images; comparing the input vector with the reference vectors for determining, according to a predefined condition, the most similar reference vector; and inputting image data of the plurality of objects to the neural network represented by the most similar reference vector for determining whether the plurality of objects have the same identity.

12 Claims, 4 Drawing Sheets

(51) Int. Cl.
    *G06F 18/22*     (2023.01)
    *G06N 3/045*     (2023.01)
    *G06T 5/50*     (2006.01)
    *G06V 10/44*     (2022.01)
    *G06V 10/764*     (2022.01)
    *G06V 10/82*     (2022.01)
    *G06V 20/52*     (2022.01)
    *G06V 40/00*     (2022.01)
    *G06V 40/10*     (2022.01)
    *G06V 40/20*     (2022.01)

(52) U.S. Cl.
    CPC ............... *G06N 3/045* (2023.01); *G06T 5/50* (2013.01); *G06V 10/44* (2022.01); *G06V 10/764* (2022.01); *G06V 10/82* (2022.01); *G06V 20/52* (2022.01); *G06V 40/23* (2022.01)

(58) Field of Classification Search
    CPC ....... G06F 18/22; G06F 18/214; G06N 3/045; G06T 5/50
    See application file for complete search history.

(56) References Cited

U.S. PATENT DOCUMENTS 11,775,851 B2*   10/2023   Lee ..................... G06N 3/045
                                                                             726/17
2013/0156260 A1   6/2013   Craig
2018/0129865 A1   5/2018   Zia et al.
2018/0158197 A1   6/2018   Dasgupta et al.
2020/0082635 A1*   3/2020   Zhu ..................... G06T 7/248

FOREIGN PATENT DOCUMENTS

GB           2560387 A1     9/2018
WO       2019/007524 A1     1/2019

* cited by examiner

METHOD OF OBJECT RE-IDENTIFICATION

TECHNICAL FIELD

The present invention relates to the field of object re-identification with assistance of neural networks.

BACKGROUND

Object re-identification technologies have been widely studied and used for, e.g., identifying and tracking objects in related digital images.

It is known that humans can easily recognize and associate objects of the same identity in images, even when the objects become occluded to various degrees or even disappear from a scene for a short or a long time. The appearance of objects may furthermore vary depending on viewing angle and overtime. However, re-identification of objects is challenging for a computer vision system, especially in scenes where objects become occluded, i.e. not fully visible, or completely disappear from the scene and show up later in the same or in another scene.

For example, one challenge is to resume tracking of an object when it has exited the scene and entered the same or another scene that is monitored by another camera. If a tracking algorithm is unable to resume tracking, the object will be identified as a new, different object which may disturb other algorithms for video analysis.

There exist proposals of using neural network for aiding in re-identification. However, there is a need for providing an improved method and apparatus for re-identifying objects in images and videos.

SUMMARY

Providing a method of re-identification with the aid of neural networks for re-identification as mentioned above, comes with possible drawbacks. For example, a neural network trained on images of complete body structures may fail to re-identify a person in image frames where only an upper body part of the body structure is visible. It has also been shown that it is difficult for neural networks to successfully perform re-identification based on images that show different amount of an object, for example images that show an upper body in some of the images and a full body in some of the images. This may be the case, e.g., when monitoring a scene where people are entering the scene (showing full bodies), sitting down (showing upper body), and leaving the scene (showing full bodies again, but possibly in a different angle).

Hence, one drawback that exists for object re-identification is the difficulty to reidentify an object based on images that show different amounts of the object. This has been found to be a problem, e.g., for human objects.

Eliminating, or at least reducing, this and other drawbacks with presently known object re-identification methods for objects, in particular for human objects, would be beneficial.

According to a first aspect, a method of object re-identification in images of objects comprises:
  providing a plurality of neural networks for object re-identification, wherein each of the plurality of neural networks is trained on image data with different sets of anatomical features, each set being represented by a reference vector,
  receiving a plurality of images of objects and an input vector representing anatomical features that are depicted in all of the plurality of images,
  comparing the input vector with the reference vectors for determining, according to a predefined condition, the most similar reference vector,
  inputting image data of the plurality of objects to the neural network represented by the most similar reference vector for determining whether the plurality of objects have the same identity. By same identity is meant that the plurality of objects imaged in the plurality of images are in fact the same object being imaged multiple times.

Known neural networks trained on object re-identification may have difficulties to perform well when the input image data includes objects that are visible to different degrees. In other words, the re-identification fails more often when the objects of the input data are more and less occluded in the images of the input image data. The solution herein trains different neural networks on reference data that are homogeneous with respect to the amount of object that are depicted. In other words, different neural networks have been trained on different sets of anatomical features for an object type. Depending on the image data that re-identification to be performed is based on, a suitable neural network is selected. Specifically, the neural network is trained on data with a set of anatomical features that fulfils a predetermined condition is selected. The predetermined condition is a type of similarity condition that defines which degree of similarity compared vectors have. Before the selection of neural network, an input vector for the image data is determined. The input vector represents the anatomical features that are depicted in all images of the image data. This input vector is compared to reference vectors of the neural networks, wherein each reference vector represents anatomical features of the reference data for its corresponding neural network. By adding the solution as a pre-step to inputting the image data to a neural network for re-identification, the performance of re-identification is improved without the need for complex algorithms, e.g., for estimating non-depicted object parts. The inventive solution is relatively non-complex to implement by use of known algorithms for determining anatomical features that are depicted in all of a plurality of images, and by reference known neural network structures for re-identification.

The object is of a type that can be re-identified by image analysis. This means that individuals or individual groups of the object type is possible to separate from each other based on appearance. Each individual of an object type does not need to be uniquely identifiable relative all other individuals of that object type. It may suffice that there exist differences between some individuals or individual groups for the inventive method to be beneficial.

The object type may be human. In such an embodiment, the method is directed towards re-identification of human objects. Other non-limiting examples of object types are vehicles, animals, luggage objects (such as suitcases, backpacks, handbags, and other type of bags), and parcels (including letters). The method could be extended to perform re-identification on larger objects such as buildings and geographical landmarks as long as they can be re-identified by image analysis as defined above.

By anatomical features is within the context of the present application meant different unique parts of an object. For a human body, the anatomical features include, for example, nose, eye, elbow, neck, knee, foot, shoulder, and hand. A part can have different appearance between different objects. For example, feet with or without shoes, or with differently looking shoes, have different appearance but are still regarded as the same anatomical feature. For a vehicle, the anatomical features include, for example, window frame, wheel, tail light, side mirror, and sun roof. By unique parts is meant that the anatomical features do not overlap with each other. For example, an arm of a human body comprises different unique anatomical features being, for example, shoulder, upper arm, elbow, forearm, wrist, and backhand. The anatomical features may be seen as corresponding to different physical points on an object, wherein the anatomical features are expressed in terms of object parts surrounding respective point.

By input vector/reference vector is meant a representation vector for input/reference values that represents anatomical features. Depending on how the anatomical features are determined and thus represented, by for example keypoints, the input/reference vector may have different forms. The representation may thus differ between different implementations, which is a known fact that can be handled by the skilled person based on prior knowledge. As an example, the input/reference vector may have the form of a one-dimensional vector with numeric values. The input/reference vector may be a vector with binary values wherein each position in the vector represents an anatomical feature. For example, 1 in a particular position in the vector may indicate the corresponding anatomical feature is detected/visible and 0 may indicate that the corresponding anatomical feature is not detected/not visible.

The input vector may be a keypoint vector, representing keypoints of human objects, an edge vector (representing edges of objects), or a contour vector (representing contours of objects). Keypoints are well-known for use in object detection and handling in image data. The keypoints of an object can be found by use of a neural network. Keypoints may represent anatomical features.

Edges or contours of an object provide an alternative way to represent an object in image data. It is well-known how to determine depicted edges or contours of objects in given image data, for example by methods known as Sobel, Prewitt, and Laplacian. Edges and contours may be determined by use of neural networks designed and trained for such purposes. From the edges or contours, anatomical features may be determined.

The predefined condition may define determining a reference vector being equal to the input vector as the most similar reference vector. In other words, the most similar reference vector is in this embodiment a reference vector that is equal to the input vector. The corresponding neural network associated with that reference vector should then be used for the re-identification. The selected neural network is in this embodiment trained on images that include the same anatomical features that all images in the input image data (i.e. in the plurality of images) include.

The predefined condition may define determining a reference vector, from the reference vectors, having the largest overlap with the input vector as the most similar reference vector. The neural network corresponding to such a reference vector is trained on image data with anatomical features that are all represented in the plurality of images. This embodiment can form a second option to the previous disclosed embodiment. That is, the method may first try to find an equal reference vector to the input vector, and upon not succeeding, select the reference vector that has the largest overlap with the training vector. Other conditions may be included as well, for example that the input vector needs to fulfil a certain quality condition as will be disclosed later.

If more than one reference vector exist that fulfil the condition for similarity (being equal or having the same amount of overlap), the predefined condition may comprise further selection criteria. For example, some anatomical features represented by the input vector may have greater impact on the re-identification than other, and a reference vector that represents the one or more important anatomical features is then selected before other reference vectors. Another example is to select the largest matching subset between the input vector and a reference vector among the reference vectors that fulfil other criteria of the selection criteria.

The predefined condition may define determining a reference vector, from the reference vectors, comprising the largest number of overlapping anatomical features, as defined by a priority list, with the input vector. In other words, the input vector is compared with the reference vectors to find the reference vectors that has the largest overlap of a group of anatomical features that are included in the priority list. The priority list is predefined and may list anatomical features that are known to increase the chance of successful re-identification. Such anatomical features may include eye, nose, mouth, shoulder, etc. The priority list may differ between different applications and may be correlated with the configuration of the neural networks or with feedback on the performance of the neural networks. For example, if it is determined that the neural networks perform particular well on images including image data for shoulders, this anatomical feature is added to the priority list. A dynamical update of the priority list based on feedback may thus be achieved.

The method may further comprise:
  evaluating the input vector against a pre-set quality condition,
  upon the pre-set quality condition being fulfilled, performing the steps of comparing the input vector and inputting image data, and
  upon the pre-set quality condition not being fulfilled, discarding at least one image in the plurality of images, determining a new input vector, as the input vector, based on the plurality of images, and iterating the method from the step of evaluating the input vector.

This embodiment adds quality assurance to the method. Even with the suggested method, wherein a suitable neural network for re-identification is chosen, a poor quality of the input data can reduce the performance of the neural network. By assuring the input data has a certain quality, a minimum performance level is maintained. The pre-set quality condition may be, e.g., a minimum vector size.

The evaluation of the input vector against a pre-set quality condition may comprise an act of comparing the input vector to a pre-defined list of anatomical features from which at least one anatomical feature should be represented in the input vector.

If the condition is not fulfilled, the method may comprise a further act of discarding one or more of the plurality of images and iterate the method based on the reduced plurality of images. The images that are discarded may be selected based on their content. For example, images that do not include any of the anatomical features in the pre-defined list may be discarded. This step of discarding may be performed before the evaluation of the input vector, to make the method quicker.

The plurality of images may be captured by one camera at a plurality of time points. The plurality of images thus forms an image sequence depicting a scene. In another embodiment, the plurality of images may be captured by a plurality of cameras covering the same scene from different angles. The plurality of images thus forms a plurality of image sequences. In yet another embodiment, the plurality of images may be captured by a plurality of cameras depicting different scenes, which also results in a plurality of image sequences.

Re-identification may be interesting to perform in each of these scenarios, however the purpose and application of the re-identification may differ. The re-identification may for example assist an object tracking algorithm, which is more common to apply in monitoring of a single scene, rather than different scenes. A purpose of the re-identification may in such an embodiment be to alleviate resuming tracking of a person after it has been occluded.

In another scenario, cameras monitor the same scene from different angles. The plurality of images may be taken at the same point in time. A purpose of the re-identification can be to connect images that include the same object but are acquired by different cameras.

In a scenario with different scenes, each monitored by a camera, the plurality of images may be collected from the different cameras. A purpose of the re-identification may in such a scenario be long-term tracking in which a person leaves one scene and shows up in another scene, potentially minutes, hours, or even days later. The scenes may, e.g., be different parts of a city and the purpose of the re-identification may be to track a wanted person or vehicle.

The inputting of image data of the plurality of images may comprise inputting image data representing only the anatomical features that are depicted in all of the plurality of images. The method may in this embodiment comprise an act of filtering the image data of the plurality of images based on the anatomical features that are depicted in all of the plurality of images, before the step of inputting image data to the selected neural network.

The method may further comprise, as part of the step of receiving the plurality of images:
  acquiring the plurality of images by one or more cameras,
  determining anatomical features that are depicted in all of the plurality of images, and
  determining an input vector representing the determined anatomical features.

In other words, the method may comprise an initial process of forming the plurality of images. The plurality of images may be prepared according to this embodiment by another processor than the one performing the main part of the method (i.e. the comparison of the input vector to reference vectors for determining of a neural network). Alternatively, the preparation may be performed within the same processing unit. The outcome of the initial process, being the input vector and the plurality of images, may be transmitted within or to the processing unit that is to perform the subsequent method steps.

The step of receiving the plurality of images in the method may comprise:
  capturing images by one or more cameras, and
  selecting the different images to form the plurality of images based on a predetermined frame distance, time gap, image sharpness, poses of depicted objects, resolution, an aspect ratio of a region, and plane rotation.

In other words, the images that are suitable candidates for the re-identification may be filtered out as an initial step to the main method of determining a suitable neural network. A purpose of the filtering may be to select images that are likely to have the same objects, and/or that the method can perform well on.

According to a second aspect, the above-mentioned and other objects are achieved, in full or at least in part by a non-transitory computer readable recording medium having computer readable program code recorded thereon which when executed on a device having processing capability is configured to perform the method of any one of the disclosed methods above.

According to a second aspect, the above-mentioned and other objects are achieved, in full or at least in part by a controller for controlling a video processing unit to facilitate object re-identification. The controller has access to a plurality of neural networks for object re-identification, wherein each of the plurality of neural networks is trained on image data with different sets of anatomical features, each set being represented by a reference vector. The controller comprises:
  a receiver configured to receive a plurality of images of human objects and an input vector representing anatomical features that are depicted in all of the plurality of images,
  a comparing component adapted to compare the input vector with the reference vectors for determining, according to a predefined condition, the most similar reference vector,
  a determining component configured to input image data of the plurality of objects to the neural network represented by the most similar reference vector for determining whether the plurality of human objects have the same identity, and
  a control component configured to control the video processing unit whether to regard the plurality of objects as having the same identity.

The image processing unit of the third aspect may generally be embodied in the same way as the method of the first aspect with accompanying advantages.

A further scope of applicability will become apparent from the detailed description given below. However, it should be understood that the detailed description and specific examples, while indicating preferred embodiments, are given by way of illustration only, since various changes and modifications within the scope will become apparent to those skilled in the art from this detailed description.

Hence, it is to be understood that the teachings are not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
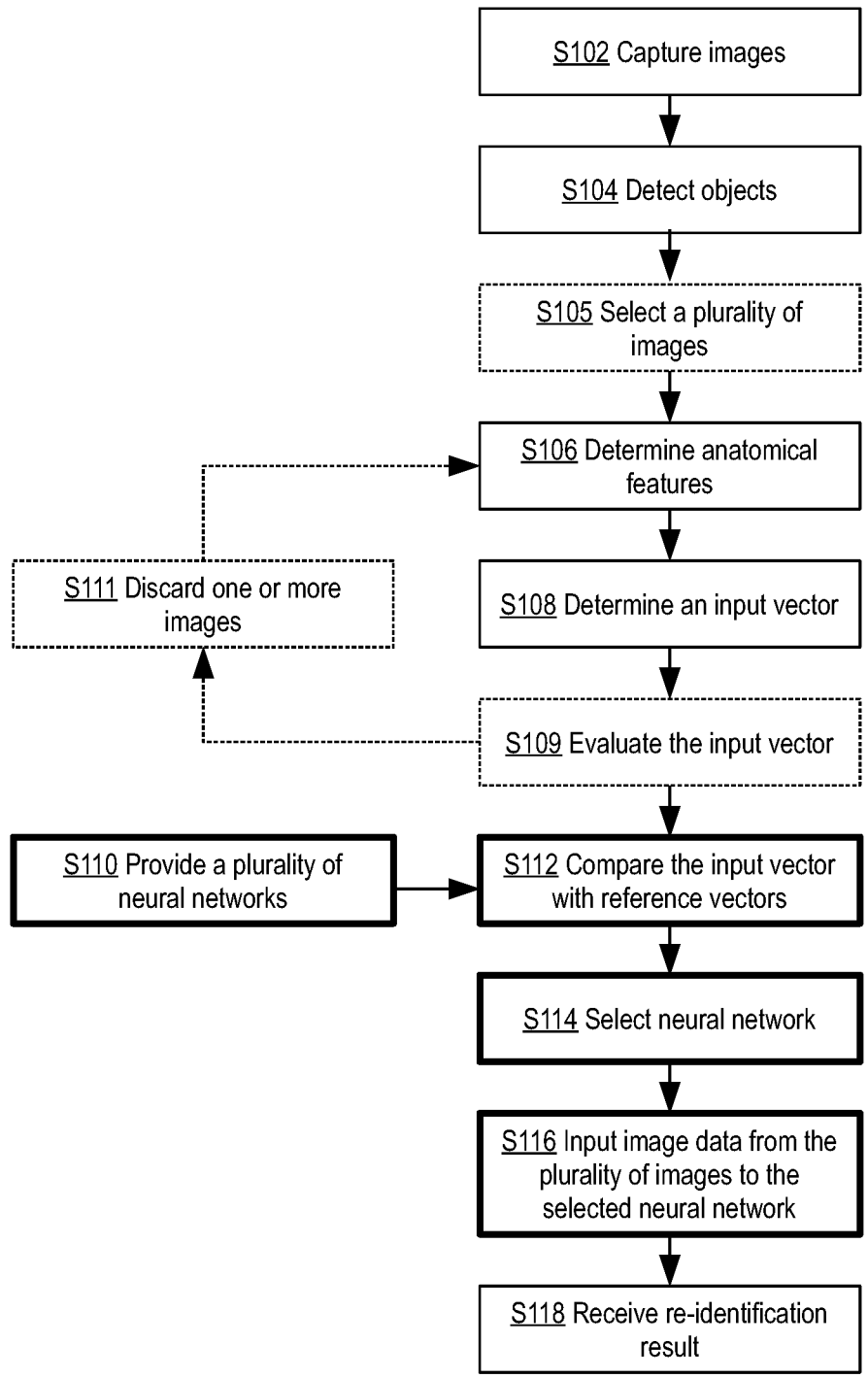
FIG. 1 illustrates a flow chart showing different embodiments of a method of object re-identification.
Figure 2:
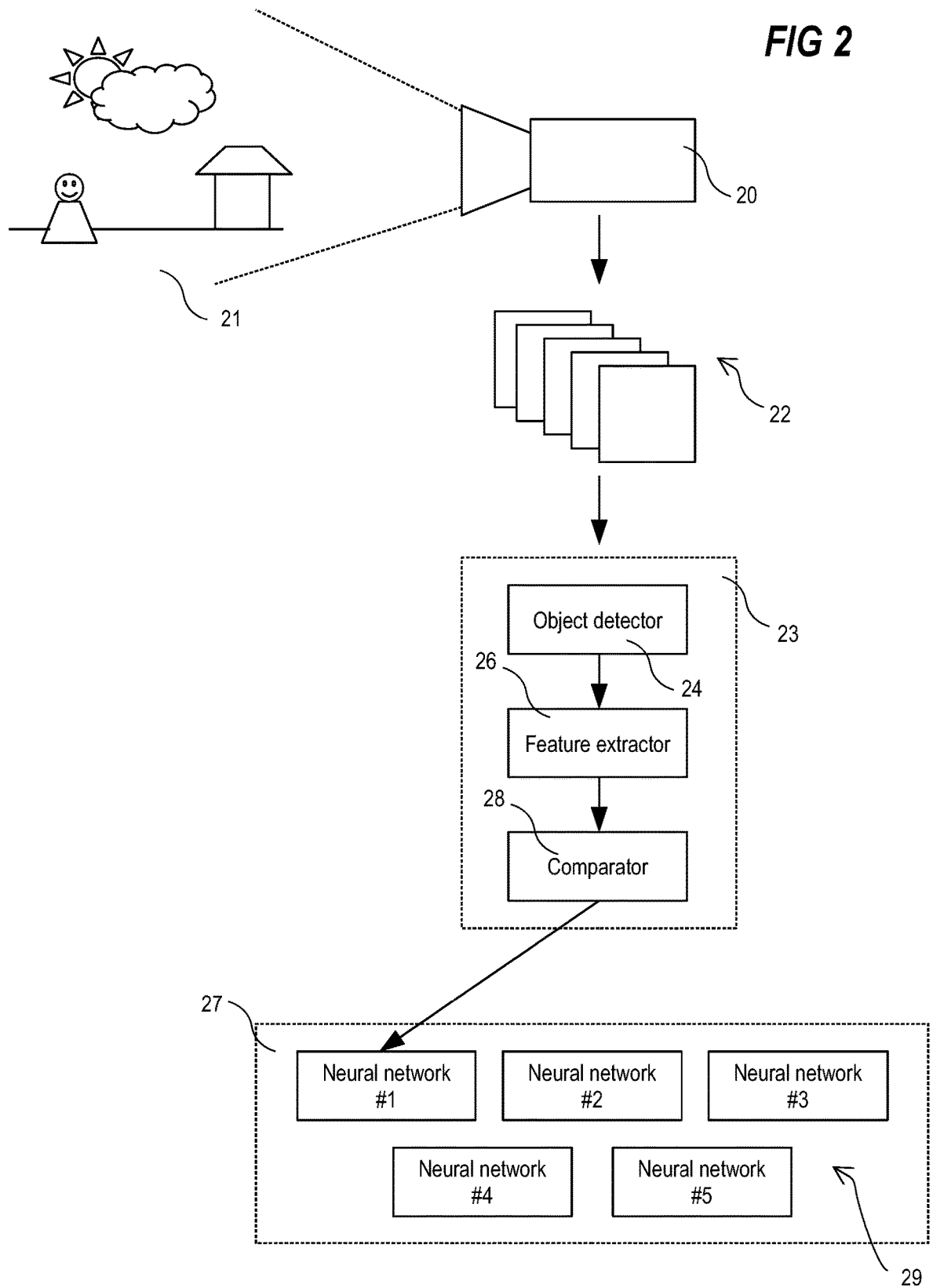
FIG. 2 provides a general overview of the method.

An overview of the method will first be disclosed with reference to FIG. 1 and FIG. 2. Selected steps of FIG. 1 will be referred to, while other steps will be disclosed later. The purpose of the method is to re-identify an object based on images that are captured by one or more cameras. As discussed earlier, the purpose of the re-identification may differ between applications.

Accordingly, the method comprises a step S102 of capturing images 22 by at least one camera 20. The camera 20 monitors a scene 21. In this embodiment, an object in the form of a human being is present in the scene and imaged by the camera 20. The images 22 are processed by a processing unit 23 that may be located in the camera 20 or as a separate unit that is in wired or wireless connection with the camera 20. The processing unit 23, detects S104 objects in the images 22 by an object detector 24. This may be performed by well-known object detection algorithms. The algorithms may be configured to detect objects of a specific type, for example human objects.

A step S105 of selecting a plurality of images from the images 22 may then be performed. Alternatively, step S105 may be performed before step S104 of detecting objects in the images 22. Details of the selection step S105 will be disclosed later.

Based on the plurality of images, anatomical features are determined by the processing unit 23, more precisely by the feature extractor 26. The determining of anatomical features may be done by performing well-known image analysis algorithms. For example, a system called "OpenPose" (disclosed in "OpenPose: Realtime Multi-Person 2D Pose Estimation using Part Affinity Fields" by Cao et al) may be used. OpenPose is a real-time system which can detect body and hand keypoints on single images.

Depending on which image analysis technique that is applied, the determined anatomical features may be represented differently. Examples of representation are by keypoints (e.g., in the form of a keypoint vector), by edges (e.g., in the form of an edge vector), or by contours (e.g., in the form of a contour vector).

Next, the processing unit 23 analyses the plurality of images and/or the representations of the determined anatomical features and determines S108 an input vector that represents the anatomical features that are represented in all of the plurality of images.

Optional steps of evaluating S109 the input vector and discarding S111 one or more images will be disclosed in detail later.

Going into the core of the inventive concept, the input vector is, after being determined, compared S112 against reference vectors which represent training data that a group 29 of neural networks #1, #2, #4, #3, #5 have been trained on. The neural networks are provided S110 to the processing unit 23, meaning that they are available for use by the processing unit 23. They may be in the form of separate neural networks, or in the form of neural networks that are included in a single neural network architecture 27 wherein the different neural networks are formed by different connections or paths in the neural network architecture. The neural networks have been trained on different training data (represented by different reference vectors). The reference vectors are provided in a format such that it can be compared with the input vector. For example, both the input vector and the reference vectors may be in the form of a keypoint vector. Alternatively, the input vector may be a keypoint vector and the reference vectors may be object landmark vectors or skeleton images for which a translation to keypoint vector format may be performed in straight-forward fashion.

The comparison S112 is performed by a comparator 28 of the processing unit 23. The purpose of the comparison S112 is to find the most similar reference vector to the input vector. The meaning of similar is defined by a predefined condition. Examples of such conditions will be disclosed in detail later. Based on the result of the comparison, a neural network (#1 in the illustrated example) is selected. Hence, the neural network that is trained on image data with anatomical features most similar to the anatomical features represented by the input vector is selected. All or selected parts of image data from the plurality of images are input S116 to the selected neural network (#1).

From the selected neural network, a result is received S118 by the processing unit 23. In other embodiments, the result of the re-identification may be transmitted to other units, such as a separate control unit. The processing unit 23 may alternatively form part of a control unit or a controller (not illustrated).

However, in this example, the processing unit 23 receives S118 the outcome from the neural network (#1). Essentially, the result provides info on whether the objects of the plurality of images have the same identity or not. The processing unit 23 uses this information for controlling the camera 20. The information may, for example, be used by the camera 20 for continuing tracking the object after it has been occluded.

In one embodiment, the method further comprises determining a pose for each detected object. The pose may be determined, e.g., for human objects based on anatomical features such as keypoints. The determined pose may be included in the input vector. In such an embodiment, the reference vectors further includes pose data corresponding to the poses of the objects in image data that the networks have been trained on. This feature may further aid in choosing a neural network for the re-identification that is suitable for the current input vector.

The functions of the processing unit 23 may be implemented as hardware, software, or a combination thereof.

In a hardware implementation, the components of the processing unit (e.g., the object detector 24, feature extractor 26, and comparator 28), may correspond to circuitry which is dedicated and specifically designed to provide functionality of the parts. The circuitry may be in the form of one or more integrated circuits, such as one or more application specific integrated circuits or one or more field-programmable gate arrays.

In a software implementation, the circuitry may instead be in the form of a processor, such as a microprocessor, which in association with computer code instructions stored on a (non-transitory) computer-readable medium, such as a non-volatile memory, causes the processing unit 23 to carry out (part of) any method disclosed herein. Examples of non-volatile memory include read-only memory, flash memory, ferroelectric RAM, magnetic computer storage devices, optical discs, and the like. In a software case, the components of the processing unit 23 may thus each correspond to a portion of computer code instructions stored on the computer-readable medium, that, when executed by the processor, causes the processing unit 23 to carry out the functionality of the component.

It is to be understood that it is also possible to have a combination of a hardware and a software implementation, meaning that the functionality of some of the components in the processing unit 23 are implemented in hardware and others in software.

Figure 3:
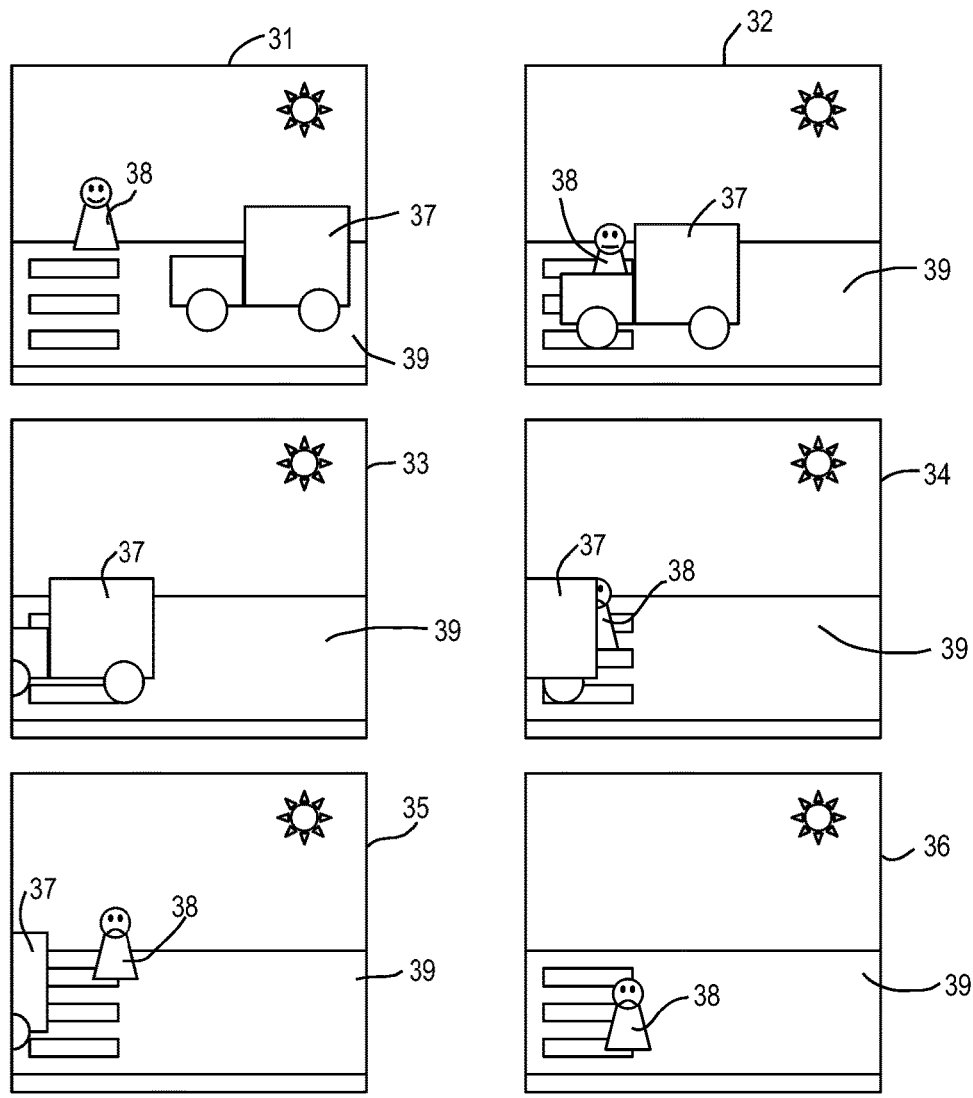
FIG. 3 illustrates an image sequence.
Figure 4:
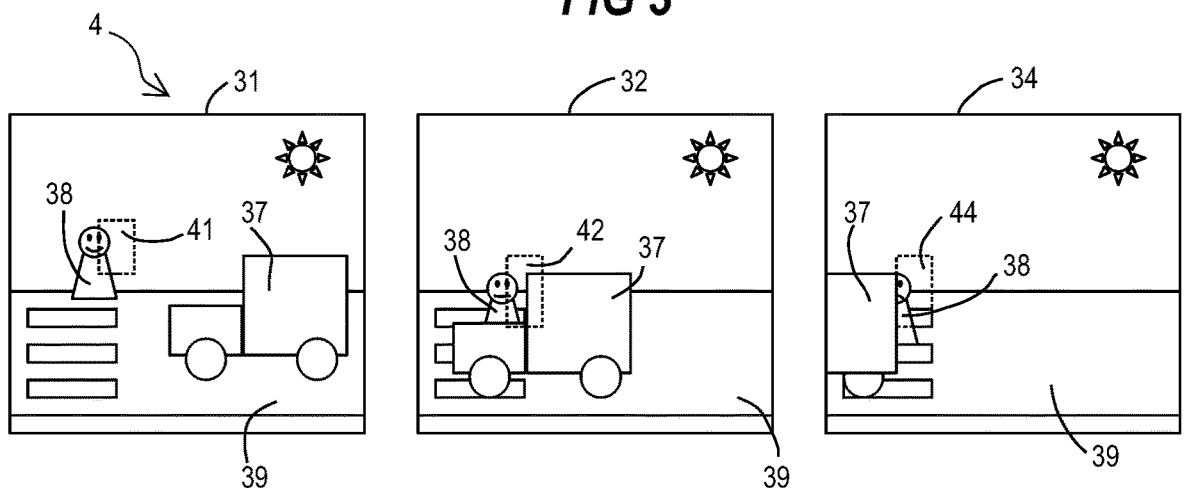
FIG. 4 illustrates a plurality of images selected from the image sequence of FIG. 3.

Going more into detail, the method will now be disclosed with further reference to FIG. 3 and FIG. 4. FIG. 3 illustrates an image sequence that is acquired by a single surveillance camera that monitors a scene. The image sequence comprises digital images 31-36 and are organized in a chronological order. The image sequence images a course of events in which a person 38 is about to cross a pedestrian crossing on a road 39 when a truck 37 ignores to give way, which (needless to say) angers the person 38 who abruptly has to move to the side before continuing to cross the road 39. When the truck 37 drives by the person 38, the latter is occluded by the truck 37, as seen from the camera's angle. A tracking algorithm that tries to track the person 38 will possibly fail to continue tracking of the person 38 after the occlusion. Instead, the person 38 will, after the occlusion, be detected as a new object with a new identity. Re-identification may assist in curing this deficiency.

According to the method, a plurality of images 4, illustrated in FIG. 4, is selected S105 from the image sequence in FIG. 3, namely the images 31, 32, and 34. These images 31, 32, 34 may be selected based on different selection criteria. For example, images depicting one or more objects may be selected. Other non-limiting examples of selection criteria for selecting which images in a group of images that are to form the plurality of images include:

Predetermined frame distance, for example every 90th frame.

Time gap, for example every 5th second.

Image sharpness, which can be determined by determining a sharpness for each image and selecting images with the best sharpness. The sharpness may be determined for whole images or for selected areas of images, for example where objects are located or are likely to be located.

Poses of detected objects, which can be determined by looking at keypoints, edges, or contours of a detected object. Images with objects having a certain pose, or having similar poses, may be selected.

Resolution, which can be determined for whole images or for selected regions. The images with the best resolution are selected.

An aspect ratio of an object region, wherein the region may correspond to a bounding box. The aspect ratio provides information on the object size. Different aspect ratios may be suitable in different applications.

Next, object detection is performed on the plurality of images 4. In this example, one object in each image 31, 32, 34 is detected. The aim of the method is to determine whether these objects have the same identity or not. A common set of anatomical features for the detected objects in the plurality of images is determined, i.e. the anatomical features that are depicted in all of the plurality of images 4. The common set of anatomical features may be determined by determining keypoints, and is represented by an input vector. As disclosed above, the input vector is then compared S112 with reference vectors that are associated with available neural networks that may be used for re-identification of the detected objects in the plurality of images 4.

After a suitable neural network has been selected S114, according to previous disclosure, the image data from the plurality of images 4 are input to the selected neural network. In one embodiment, image data that represent only the anatomical features that are depicted in all of the plurality of images 4 are input. In other words, image data of the plurality of images 4 that represents anatomical features that are not depicted in all of the plurality of images 4 are not input to the neural network. One way to achieve such a selection of image data is to crop the images 31, 32, 34 to image areas 41, 42, 44 including the anatomical features of all the images and excluding all other anatomical features. The crops 41, 42, 44 are input to the selected neural network for processing.

By this method of analyzing the plurality of images 4, based on anatomical features, and selecting a neural network that is trained on image data matching the anatomical features of the plurality of images 4, there is an increased success chance of re-identification of the person 38 as having the same identity in the plurality of images 4.

Moving forward to another embodiment, a further step of the method is to, before comparing S112 the input vector with the reference vectors, evaluate S109 the input vector. This is a kind of quality assurance of the input vector with the aim of maintaining a lowest level of success of the re-identification. The aim is to filter out images of the plurality of images 4 that may lead to a poor result from the neural network. The evaluation may comprise to evaluate the input vector against a pre-set quality condition. The pre-set quality condition may define that the input vector needs to represent at least one in a pre-defined list of anatomical features. The content of the pre-defined list may depend on the provided neural networks, specifically which reference data that they have been trained on. For example, if the available neural networks have been trained on reference data having different sets of anatomical features being shoulder, upper arm, elbow, forearm, and backhand, the input vector may be required to represent one of the anatomical features of elbow and hand, in order for the plurality of images to be eligible for use in re-identification.

If the pre-set quality condition is fulfilled, the method continues at step S112 by comparing the input vector with the reference vectors. If the pre-set quality condition is not fulfilled, the method may comprise a step S111 of discarding one or more images from the plurality of images 4.

A first example of quality condition is that the input vector should have a minimum amount of anatomical features therein.

A second example of quality condition is that the input vector should have a predetermined number of anatomical features from a pre-defined list. The pre-defined list may correlate to the anatomical features that the neural network is trained on, to avoid processing plurality of images with anatomical features that the neural networks are not sufficiently trained on.

A third example of quality condition is that a pose, calculated from the anatomical features of the input vector, should fulfil a certain condition. For example, the pose should correspond to a normal pose of the associated body part for the anatomical feature (in the case of human objects). A purpose of this quality condition is to lower the risk of performing the method on images for which the anatomical features in the input vector has been incorrectly estimated/determined.

The discarding S111 of one or more image may include a selection of which image or images that is to be discarded. This selection may be based on the anatomical features of the images. For example, if a first image lacks one or more anatomical features that are present in all other images of the plurality of images 4, this first image may be discarded. In the illustrated example, the first image may be image 34 which lacks the anatomical feature of a second eye that the rest of the images 31, 32 depicts. The image 34 may thus be discarded and the method may start again from step S106 of determining anatomical features, now based on only images 31 and 32 of the updated plurality of images 4.

It should be noted that the image sequences and plurality of images that are illustrated and discussed herein are provided as simplified examples and adapted for an easy understanding of the inventive concept. In reality, the image sequences and plurality of images include lots of more images. Typically, there are more than one object detected in one or more of the images. The method may comprise selecting one object for an image in the plurality of images to perform the method for. Moreover, the method may be adapted to compare an object of one image in the plurality of images with objects in the other images of the plurality of images.

Figure 5:
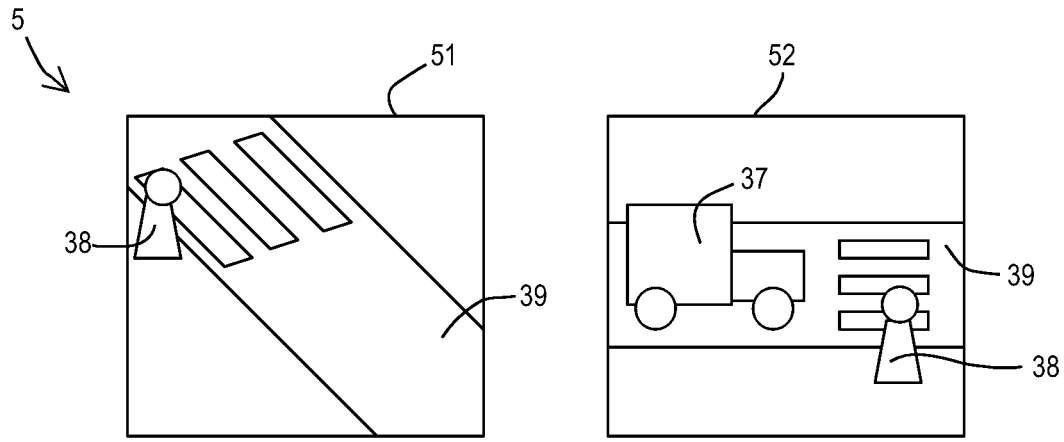
FIG. 5 illustrates a pair of images captured from different angles from a scene.

FIG. 5 illustrates an example of a plurality of images 5, including a first image 51 and a second image 52, that is captured by different cameras monitoring the same previously described scene, where the person 38 is about to cross the road 39 on which the truck 37 is driving. The method may in this example fulfil a purpose of evaluating if the objects 38 that are depicted in the images 51, 52 have the same identity. The images 51, 52 may be captured at the same point in time.

Figure 6:
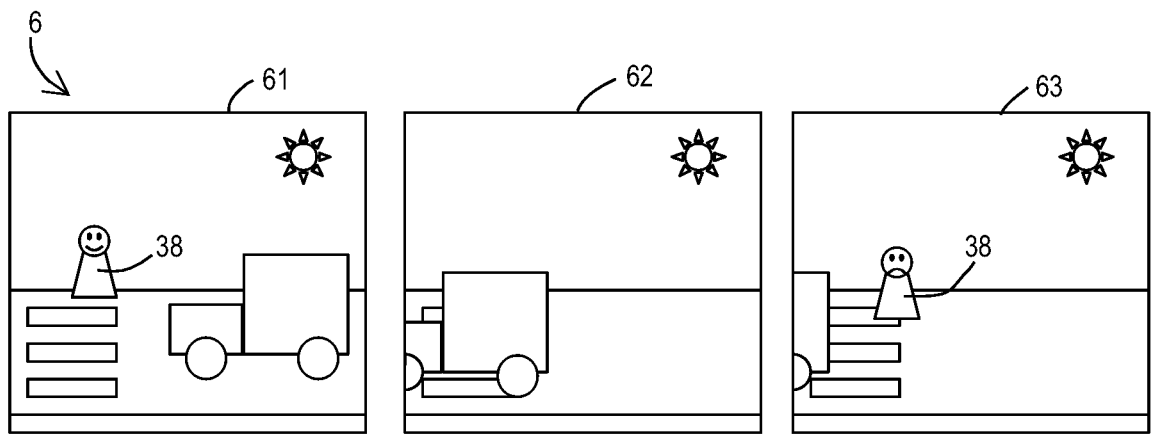
FIG. 6 illustrates a plurality of images selected from different image sequences.
Figure 6:
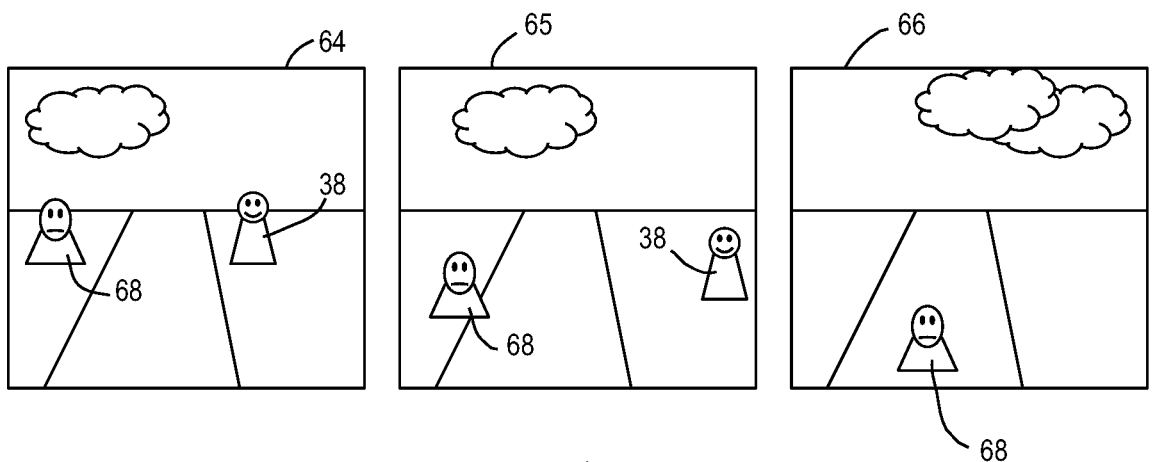

FIG. 6 illustrates a plurality of images 6 captured by different cameras monitoring different scenes. The upper three images 61, 62, 63, forming a first image sequence, correspond to a selection of images from FIG. 3. The lower three images 64, 65, 66, forming a second image sequence, depicts two different objects 38, 68. Of course, the method does not on beforehand know if the objects of the images have the same identity, for example if the object 68 of image 64 is the same person as object 38 of image 63. To solve this question is the actual purpose of the method.

According to the method, objects 38, 68 are detected in the plurality of images 6. The plurality of images has in this embodiment been selected from image sequences based on time distance, i.e. there is a predetermined time gap between each of the images in each image sequence of the plurality of images 6. The method may comprise a further step of evaluating the selected plurality of images 6 and discard images for which no objects are detected. In this example, image 62 is discarded. The objects 38, 68 are detected in the rest of the images 61, 63, 64, 65, 66 which now forms the plurality of images 6. As mentioned above, the method may comprise a further step of selecting an object for an image to be compared with objects of other images with the purpose of re-identification. The object 38 of image 61 may be selected to be compared with the object 68 of image 64, the object 38 of image 65 and the object 68 of image 66. The method may be performed on the group of images 61, 64, 65, 66 at the same time, with the option to discard S111 one or more images if suitable. Or, the method may be performed on image pairs of the group of images 61, 64, 65, 66. For example, first on the image pair 61, 64, focusing on the object 38 of image 61 and object 68 of image 64. This re-identification will likely result in a negative result, i.e. the object 38 in image 61 does not have the same identity as the object 68 of image 64. Next, the image 61 may be compared with the image 65, focusing on the object 38 of both images. This re-identification will likely result in a positive result, i.e. the object 38 in image 61 has the same identity as the object 38 of image 65. Alternatively, the image 61 may be compared with image 64 again, now instead focusing on object 38 in image 64 (instead of object 68). This re-identification will likely have a positive outcome.

In other words, the method may be performed iteratively, where the plurality of images is updated in or before each iteration. Depending on the purpose of the re-identification, different numbers of images are processed in one iteration. Regardless of how many images and which purpose the re-identification has, the method relies on the inventive concept of selecting one neural network, from a plurality of networks trained on different sets of anatomical features, for performing a re-identification task based on a plurality of images that depicts objects. As exemplified, it is appreciated that the present teachings not limited to the embodiments shown, and several modifications and variations are conceivable within the scope of the teachings.

In order to aid even further in the understanding, here follows a summary and a concrete example of the claimed method. The purpose is to reduce a drawback with present methods of object re-identification, namely that it is difficult to re-identify an object based on images that show different number of anatomical features for the object. For example, some images depict full body objects and other images depict only upper body objects. This drawback has been identified by the inventors and exists for, e.g., human objects. The inventors propose to set up several neural networks for object re-identification where each network is trained on different configurations of anatomical features for object of an object class. Further, the inventors propose to employ the neural network that is trained on the most similar configuration of anatomical features as the anatomical features being depicted in all of the images in a set of images to be analyzed.

To not make the example unnecessary complex, we provide only two neural networks for object re-identification, although more may be utilized. Each neural network is trained on image data with different sets of anatomical features. Each set of anatomical features is represented by a keypoint vector which is referred to as a reference vector. The keypoint vector is in this example a one-dimensional binary vector where each position in the vector indicates a certain anatomical feature. A vector position value of 1 means that the anatomical feature of that position is visible, and a value of 0 means that the anatomical feature is not visible. An example of such a keypoint vector could look like this:

[a b c d e f]

The vector positions a-f indicate the following anatomical features:

a: eyes
b: nose
c: mouth
d: shoulder
e: elbow
f: hand

For example, a keypoint vector of [1 1 1 0 0 1] for a detected object in an image means that eyes, nose, mouth, and hand are visible while shoulder and elbow are not.

Each neural network is trained on image data with a different set of anatomical features. For example, a first neural network is trained on image data with faces including a first set of anatomical features of eyes, nose, and mouth. A first reference vector representing the first set of anatomical features is [1 1 1 0 0 0]. The second neural network is trained on image data with lower arms including a second set of anatomical features of elbow and hand. A second reference vector representing the second set of anatomical features is [0 0 0 0 1 1].

The two neural networks can be described as neural networks that are trained to perform object re-identification based on different anatomical features in input image data. The first neural network is particularly good at performing object re-identification based on images depicting eyes, nose, and mouth, while the second neural network is particularly good at performing object re-identification based on images depicting elbow and hand.

Now to the input vector. This is also of a keypoint vector format. The input vector is going to be compared with the reference vectors in order to find the most similar reference vector and thus the most suitably trained neural network for the task of object re-identification. To alleviate the comparison, the keypoint vector for the input vector may be constructed in the same manner as the reference vector, namely as [a b c d e f] above. However, to perform a comparison between keypoint vectors of different formats is a task that is easily solved by the skilled person using conventional methods. For example, the input vector may have another size (i.e. more or fewer vector positions) and/or include more or less anatomical features. As long as it is clearly defined how to read out which anatomical features are detected and not from a keypoint vector it is possible to make the comparison.

However, we continue with the low-complex example and construct the input vector in the form of a keypoint vector [a b c d e f] which is identical to the construction of the reference vector. In order to determine the input vector, a received plurality of image is analyzed to determine which anatomical features are depicted in each of them. For an anatomical feature that is represented in all of the plurality images, the corresponding vector position in the input vector is 1 and thus indicated that the anatomical feature is visible. For an anatomical feature that is not depicted in each and every image in the plurality of images, the corresponding input vector position is 0, i.e. the anatomical feature is indicated as not visible. Let's suppose that we get the input vector [0 1 1 1 0 1] which means that the anatomical features of nose, mouth, shoulder, and hand are visible in each image of the plurality of images.

Next, the input vector is compared to each of the reference vectors to determine, according to a predetermined condition, the most similar reference vector. In other words, the input vector of [0 1 1 1 0 1] is compared with each of [1 1 1 0 0 0] and [0 0 0 0 1 1]. The predetermined condition may, e.g., be the largest number of overlapping anatomical features. The outcome of the comparison with that predetermined condition is that the first reference vector [1 1 1 0 0 0] is the most similar vector which is associated with the first neural network. Hence, the first neural network is selected to perform the object re-identification based on the plurality of images with the aim of determining whether the plurality of object depicted in the plurality of images have the same identity.

The invention claimed is:

1. A method of object re-identification in images of objects of an object type, the method comprising:
providing a plurality of neural networks for object re-identification, wherein different neural networks in the plurality of neural networks have been trained, to perform object re-identification, on different sets of anatomical features for the object type, and wherein each set of anatomical features is represented by a reference vector in the form of a keypoint vector with keypoints representing the anatomical features,
receiving a plurality of images of objects of the object type,
determining keypoints representing anatomical features of the object type in each of the plurality of images,
determining an input vector representing anatomical features that are determined in all of the plurality of images, wherein the input vector is in the form of a keypoint vector representing the anatomical features,
comparing the input vector with the reference vectors for determining, according to a predefined condition, the most similar reference vector,
selecting a neural network from among the plurality of neural networks based upon the comparison of the input vector with the reference vectors; and
inputting image data, comprising all or parts of image data of the plurality of images, of the plurality of objects to the selected neural network represented by the most similar reference vector for determining whether the plurality of objects have the same identity,
wherein a performance of the object re-identification on the input image data of the plurality of objects is improved based upon the performance by the selected neural network.

2. The method according to claim 1, wherein the object type is human.

3. The method according to claim 1, wherein the predefined condition defines determining a reference vector being equal to the input vector as the most similar reference vector.

4. The method according to claim 1, wherein the predefined condition defines determining a reference vector, from the reference vectors, having the largest overlap with the input vector as the most similar reference vector.

5. The method according to claim 1, wherein the predefined condition defines determining a reference vector, from the reference vectors, comprising the largest number of overlapping anatomical features, as defined by a priority list, with the input vector.

6. The method according to claim 1, further comprising:
evaluating the input vector against a pre-set quality condition,
upon the pre-set quality condition being fulfilled, performing the steps of comparing the input vector and inputting image data, and
upon the pre-set quality condition not being fulfilled, discarding at least one image in the plurality of images, determining a new input vector, as the input vector, based on the plurality of images, and iterating the method from the step of evaluating the input vector.

7. The method according to claim 6, wherein the evaluation of the input vector comprises comparing the input vector to a pre-defined list of anatomical features from which at least one anatomical feature should be represented in the input vector.

8. The method according to claim 1, wherein the plurality of images is captured by one camera at a plurality of time points, by a plurality of cameras covering the same scene from different angles, or by a plurality of cameras depicting different scenes.

9. The method according to claim 1, wherein the inputting of image data of the plurality of images comprises inputting image data representing only the anatomical features that are depicted in all of the plurality of images.

10. The method according to claim 1, wherein the step of receiving the plurality of images comprises:
capturing images by one or more cameras, and
selecting the different images to form the plurality of images based on a predetermined frame distance, time gap, image sharpness, poses of depicted objects, resolution, an aspect ratio of a region, and plane rotation.

11. A non-transitory computer readable recording medium having computer readable program code recorded thereon which when executed on a device having processing capability is configured to perform a method of object re-identification in images of objects of an object type, the method comprising:

provide a plurality of neural networks for object re-identification, wherein different neural networks in the plurality of neural networks have been trained, to perform object re-identification, on different sets of anatomical features for the object type, and wherein each set of anatomical features is represented by a reference vector in the form of a keypoint vector with keypoints representing the anatomical features, receiving a plurality of images of objects of the object type, determining keypoints representing anatomical features of the object type in each of the plurality of images, determining an input vector representing anatomical features that are determined in all of the plurality of images, wherein the input vector is in the form of a keypoint vector representing the anatomical features, comparing the input vector with the reference vectors for determining, according to a predefined condition, the most similar reference vector, selecting a neural network from among the plurality of neural networks based upon the comparison of the input vector with the reference vectors; and inputting image data, comprising all or parts of image data of the plurality of images, of the plurality of objects to the selected neural network represented by the most similar reference vector for determining whether the plurality of objects have the same identity, wherein a performance of the object re-identification on the input image data of the plurality of objects is improved based upon the performance by the selected neural network.

12. A controller for controlling a video processing unit to facilitate object re-identification, the controller having access to a plurality of neural networks for object re-identification in images of objects of an object type, wherein different neural networks in the plurality of neural networks have been trained, to perform object re-identification, on different sets of anatomical features for the object type, and wherein each set of anatomical features is represented by a reference vector in the form of a keypoint vector with keypoints representing the anatomical features, the controller in communication with a processor and memory and configured to perform:

a receiving function to receive a plurality of images of objects of the object type a determining function to determine keypoints representing anatomical features of the object type in each of the plurality of images, and determine an input vector representing anatomical features that are determined in all of the plurality of images, wherein the input vector is in the form of a keypoint vector representing the anatomical features, a comparing function to compare the input vector with the reference vectors for determining, according to a predefined condition, the most similar reference vector, a selecting function to select a neural network from among the plurality of neural networks based upon the comparison of the input vector with the reference vectors; and an input function to input image data, comprising all or parts of image data of the plurality of images, of the plurality of objects to the selected neural network represented by the most similar reference vector for determining whether the plurality of objects have the same identity, and a control function to control the video processing unit whether to regard the plurality of objects as having the same identity, wherein a performance of the object re-identification on the input image data of the plurality of objects is improved based upon the performance by the selected neural network.

* * * * *